United States Patent [19]

Carder et al.

[11] 3,939,126

[45] Feb. 17, 1976

[54] ACRYLYL-TERMINATED UREA-URETHANE COMPOSITIONS

[75] Inventors: Charles H. Carder, Charleston, W. Va.; George W. Borden, East Lyme, Conn.

[73] Assignee: Union Carbide Corporation, New York, N.Y.

[22] Filed: Sept. 5, 1974

[21] Appl. No.: 503,473

[52] U.S. Cl................... 260/77.5 CR; 260/77.5 AQ
[51] Int. Cl.² ......................................... C08G 18/32
[58] Field of Search..... 260/77.5 CR, 471 C, 482 B, 260/482 C, 77.5 AQ

[56] References Cited
UNITED STATES PATENTS

| | | | |
|---|---|---|---|
| 2,511,544 | 6/1950 | Rinke et al.................. | 260/77.5 AQ |
| 3,509,234 | 4/1970 | Burlant et al................ | 260/77.5 CR |
| 3,779,994 | 12/1973 | Wood.......................... | 260/77.5 AQ |

*Primary Examiner*—M. J. Welsh
*Attorney, Agent, or Firm*—Francis M. Fazio

[57] ABSTRACT

Acrylyl-terminated urea-urethane compositions that are the reaction product of an organic polyisocyanate, a hydroxylamine and a hydroxyhydrocarbyl acrylate. These compositions can be used in the preparation of coatings and inks.

8 Claims, No Drawings

ACRYLYL-TERMINATED UREA-URETHANE COMPOSITIONS

BACKGROUND OF THE INVENTION

The coating and ink industry has been seeking new derivatives that can be used in compositions that do not require appreciable amounts of volatile solvents that evaporate and pollute the atmosphere. The novel compounds of this invention can be used in coating and ink formulations that are readily cured by ultraviolet, thermal or electron beam processes.

SUMMARY OF THE INVENTION

A new class of acrylyl-terminated urea-urethane compositions has been discovered comprising the reaction products of an organic polyisocyanate, an organic hydroxylamine and a hydroxyhydrocarbyl acrylate. The new compositions of this invention contain both urea and urethane groups and terminal acrylyl groups. As a consequence, the compositions show the advantageous properties of the ureas as well as of the urethanes. In addition, the terminal reactive acrylyl group makes them ideally suitable for use in coating and ink compositions. Thus, the new compounds of this invention find particular utility in the manufacture of inks and coatings.

DESCRIPTION OF THE INVENTION

In the production of the compositions of this invention an organic polyisocyanate having at least two isocyanato groups is reacted with a hydroxylamine and a hydroxyhydrocarbyl acrylate.

The organic polyisocyanates suitable for use in the production of the compounds of this invention are any of the known polyisocyanates; the preferred are those having from 2 to about 5 isocyanate groups in the molecule. Illustrative thereof one can mention ethylene diisocyanate, trimethylene diisocyanate, hexamethylene diisocyanate, propylene-1,2-diisocyanate, ethylidene diisocyanate, cyclopentylene-1,3-diisocyanate, the 1,2-, 1,3- and 1,4-cyclohexylene diisocyanates, the 1,3- and 1,4-phenylene diisocyanates, polymethylene polyphenylene-isocyanates, the 2,4- and 2,6-tolylene diisocyanates, the 1,3- and 1,4-xylylene diisocyanates, bis(4-isocyanatophenyl)methane, 4,4′-diphenylpropane diisocyanates, the polyisocyanates disclosed in U.S. Pat. No. 2,683,730, bis(2-isocyanatoethyl)carbonate, 1,8-diisocyanato-p-menthane, (OCNCH$_2$CH$_2$CH$_2$OCH$_2$)$_2$, 1-methyl-2,4-diisocyanatocyclohexane, the chlorophenylene diisocyanates, naphthalene-1,5-diisocyanate, triphenylmethane-4,4′,4″-triisocyanate, isopropylbenzene-alpha-4-diisocyanate, 5,6-bicyclo[2.2.1]hept-2-ene diisocyanate, 5,6-diisocyanatomethylbicyclo [2.2.1] hept-2-ene, 5,6-diisocyanatobutylbicyclo[2.2.1]hept-2-ene, bis(2-isocyanatoethyl)-bicyclo[2.2.1]hept-5-en-2,3-dicarboxylate, 5,6-diisocyanatopentylbicyclo[2.2.1-]hept-2 -ene, as disclosed in U.S. Pat. No. 3,275,679. The isocyanates can be used alone or in combination.

The hydroxylamines are those of the structure:
HOR′NHR
wherein R is hydrogen, a linear or branched alkyl of from 1 to about 10 carbon atoms preferably 6 to 8 carbon atoms, cycloalkyl of from 5 to 12 carbon atoms or aryl of 6 to 12 carbon atoms and R′ is a linear or branched divalent alkylene of from 1 to about 12 carbon atoms, preferably 1 to 6 carbon atoms, arylene of 6 to 12 carbon atoms or cycloalkylene of 5 to 12 carbon atoms. Illustrative thereof one can mention aminoethanol, the aminopropanols, the aminobutanols, the aminohexanols, the aminodecanols, methylethanolamine, the aminocyclohexanols, aminobenzyl alcohol, or any other amino alcohol.

The hydroxyhydrocarbyl acrylates that are used in the reaction are those of the structure:

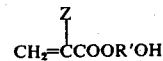

wherein R′ is as defined above and Z is hydrogen or methyl. Illustrative thereof one can mention 2-hydroxyethyl acrylate, 2-(or 1-) hydroxypropyl acrylate, 2-(or 1-) hydroxybutyl acrylate, p-hydroxyphenyl acrylate, 4-hydroxycyclohexyl acrylate, as well as the corresponding methacrylate compounds.

In producing the acrylyl-terminated urea-urethane compositions the amount of each reactant is selected so that the theoretical number of equivalents of isocyanato groups charged to the reaction mixture is from about 80 percent to about 105 percent of the sum total of the number of equivalents of hydrogen atoms reacted therewith that are present in the hydroxyl and amino groups in the hydroxylamine and in the hydroxyhydrocarbyl acrylate. Preferably the number of equivalents of isocyanato groups is from 95 to 100 percent thereof. When the polyisocyanate contains more than two isocyanato groups and is a tri- or tetra- or higher isocyanate then one can produce a cross-linked product. The preferred compositions are those which are produced with the diisocyanates since they are less viscous. In practice an excess of the hydroxyhydrocarbyl acrylate is preferably used since it can also serve as a solvent medium for the reaction.

Theoretically though applicant does not intend to be bound thereby, the primary reaction product obtained by the reaction of a hydroxyhydrocarbyl acrylate (HAA), a diisocyanate (DI) and a hydroxylamine (HA) can be represented by the general structure
wherein n is an integer having a value of from 1 to 10, preferably from 1 to 3. Thus, the unit HAA has the structure

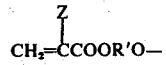

The unit DI has the structure

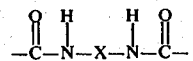

wherein X is a residue of the isocyanate compound and the unit HA represents the structure

when a triisocyanate or higher functional isocyanate is used the crosslinked structure presents a more complicated formula and those skilled in the art are well able to write these out. The molecular weight of the product can be controlled by controlling the ratio of hydroxyhydrocarbyl acrylate to hydroxylamine charged to the reaction mixture. The higher the ratio the lower the molecular weight since the hydroxyhydrocarbyl acrylate acts as a chain terminator for the reaction.

The reaction can be carried out in the presence of a solvent to facilitate stirring and as solvent one can use any conventional solvent or an intermediate which is desirably present in the subsequently formulated coating or ink but which does not interfere with the reaction at the present time. The reaction is carried out at a temperature of from about 10° to 75°, preferably from 20° to 50°C. The time required will vary depending upon the specific reactants employed, the temperature, the size of the batch and other variables. Those skilled in the art are fully familiar with the effects of these variables and will know when to stop the reaction.

Normally a catalyst is present for the urethane reaction at the conventional concentration known to those skilled in this art. The catalysts and the concentrations to be used are known to vary depending upon the particular amine or tin catalyst employed. These catalysts are so well known that they should not require more than a brief mention. They include triethylene diamine, morpholine, N-ethyl-morpholine, piperazine, trithyanolamine, triethylamine, N,N,N',N'-tetramethylbutane-1,3-diamine dibutyltin, dilaurate, stanous octoate, stannous laurate, dioctyltin diacetate, lead octoate, stannous oleate, stannous tallate, dibutyltin oxide, etc.

The following examples further serve to illustrate the invention; parts are by weight unless otherwise indicated.

EXAMPLE 1

There were charged to a flask 222 grams of isophorone diisocyanate, 167 grams of 2(N-methylcarbamoyl) ethyl acrylate as solvent (MCEA) and 0.5 gram of dibutyltin dilaurate. This was heated to 50°C., then 30.5 grams of 2-aminoethanol was added over a period of 17 minutes in a dropwise manner while controlling the temperature at about 50°C. The reaction was stirred an additional 2.75 hours at 50°C. until the exothermic reaction appeared to have terminated. Over an 80 minutes period 135 grams of 2-hydroxyethyl acrylate was added while maintaining a temperature of about 50°C. The mixture was then stirred for an additional 1.25 hours at 50°C. and permitted to cool to room temperature. The product was a 70 percent solution of the acrylate-terminated urea-urethane oligomer in the solvent.

A radiation curable composition was produced by mixing 11.43 parts of the above oligomer solution, 3.77 parts of 2(N-methylcarbamoyl)ethyl acrylate, 4.8 parts of neopentyl glycol diacrylate and 0.4 part of a mixture of the n- and iso-butyl ethers of benzoin as photoinitiator. This composition had a Gardner-Holdt viscosity of U. A thin film was coated on the Bonderite No. 37 steel and cured by exposure to the continuum light radiation from an 18 kilowatt argon swirl-flow plasma arc for 0.6 second. The cured film was about 1 mil thick; it had a Sward Hardness of 56, acetone resistance more than 300 seconds, and a Taber Wear factor of 2.8 using CS-17 wheels and one kilogram weights for 200 cycles with the wear results reported in milligrams of weight loss per 100 cycles. Impact resistance and adhesion values were low. Similar results were obtained when irradiated for 0.15 second.

EXAMPLE 2

Following the procedure similar to that of Example 1, a mixture of 900 grams of trimethylhexamethylene diisocyanate, 668 grams of 2(N-methylcarbamoyl)ethyl acrylate as solvent and 2 grams of dibutyltin dilaurate was initially reacted with 122 grams of 2-aminoethanol and then with 540 grams of 2-hydroxyethyl acrylate over a period of about 6.5 hours and then allowed to cool. The product was a 70 percent solution of the acrylate-terminated urea-urethane oligomer in the solvent.

A radiation curable composition was produced by mixing 45.7 parts of the above oligomer solution, 16.3 parts of 2(N-methylcarbamoyl)ethyl acrylate, 25 parts of neopentyl glycol diacrylate, 7 parts isodecyl acrylate, 6 parts of 2-hydroxyethyl acrylate, 7 parts of silica flatting agent and 2 parts of a mixture of the n- and iso-butyl ethers of benzoin as photoinitiator. This composition had a Gardner-Holdt viscosity of C. The composition was applied to a vinyl asbestos tile heated to 82°C. and then cured as described in Example 1. The cured coating was about 3 mils thick; it had a Sward Hardness of 20, a 60° Gardner Gloss of 63, a Taber Wear factor of 18.3 milligrams loss per 500 cycles and a 100 percent crosshatch adhesion value.

EXAMPLE 3

Following the procedure similar to that of Example 1, a mixture of 675 grams trimethylhexamethylene diisocyanate, 291 grams of 2(N-methylcarbamoyl)ethyl acrylate as solvent and 1 gram of dibutyltin dilaurate was initially reacted with 112.5 grams of monoisopropanolamine and then with 405 grams of 2-hydroxyethyl acrylate over a period of about 3 hours and then cooled to room temperature. The solution had a Gardner-Holdt viscosity above Z6.

In the same manner, acrylate-terminated urea-urethane oligomers are produced by reacting the following materials:

4. tolylene diisocyanate N-methyl-2-hydroxyethylamine 2-hydroxypropyl acrylate 5. tolylene diisocyanate p-aminobenzyl alcohol 2-hydroxybutyl acrylate 6-tolylene diisocyanate 6-aminohexanol 2-hydroxyethyl acrylate 7. -isophorone diisocyanate 2-aminoethanol 2-hydroxyethyl methacrylate 8. isophorone diisocyanate 3-aminocyclohexanol 2-hydroxyethyl acrylate 9. bis(4-isocyanatophenyl)methane 2-aminobutanol p-hydroxyphenyl acrylate 10. tolylene diisocyanate 2-aminopropanol 4-hydroxycyclohexyl acrylate 11. triphenylmethane-4,4',4''-triisocyanate 2-aminoethanol 2-hydroxyethyl acrylate.

What is claimed is:

1. An acrylyl-terminated urea-urethane comprising the reaction product obtained by reacting a mixture consisting essentially of:
   a. an organic polyisocyanate having at least 2 isocyanato groups;
   b. a hydroxylamine of the structure:
      HOR'NHR wherein R is hydrogen, alkyl of from 1 to 10 carbon atoms cycloalkyl of 5 to 12 carbon atoms or aryl of 6 to 12 carbon atoms and R' is divalent alkylene of 1 to 12 carbon atoms, arylene of 6 to 12 carbon atoms or cycloalkylene of 5 to 12 carbon atoms; and c. a hydroxyhydrocarbyl acrylate of the structure:

wherein Z is hydrogen or methyl and R' is as hereinbefore defined; and wherein the number of equivalents of isocyanato groups in the organic polyisocyanate charged is from about 80 percent to about 105 percent of the sum total of the number of equivalents of hydrogen atoms reactive therewith that are present in the hydroxyl and amine groups in said hydroxylamine and in said hydroxyhydrocarbyl acrylate.

2. A composition as claimed in claim 1, wherein said hydroxylamine R is hydrogen and R' is divalent alkylene of 1 to 6 carbon atoms.

3. A composition as claimed in claim 1, wherein said component (a) is an organic diisocyanate.

4. A composition as claimed in claim 1, wherein said component (b) is 2-aminoethanol.

5. A composition as claimed in claim 1, wherein said component (c) is 2-hydroxyethyl acrylate.

6. A composition as claimed in claim 1, wherein said component (a) is isophorone diisocyanate, said component (b) is 2-aminoethanol and said component (c) is 2-hydroxyethyl acrylate.

7. A composition as claimed in claim 1, wherein said component (a) is trimethylhexamethylene diisocyanate, said component (b) is 2-aminoethanol and said component (c) is 2-hydroxyethyl acrylate.

8. A composition as claimed in claim 1, wherein said component (a) is trimethylhexamethylene diisocyanate, said component (b) is monoisopropanolamine and said component (c) is 2-hydroxyethyl acrylate.

* * * * *